(12) United States Patent
Tsuzuki et al.

(10) Patent No.: US 6,416,463 B1
(45) Date of Patent: Jul. 9, 2002

(54) ELECTRONIC ENDOSCOPE (75) Inventors: Masaru Tsuzuki, Hachioji; Hiroshi Hasegawa, Oume, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/157,054

(22) Filed: Sep. 18, 1998

(30) Foreign Application Priority Data

Sep. 29, 1997 (JP) .............................. 9-264132

(51) Int. Cl.⁷ .............................. A61B 1/018; A61B 1/05
(52) U.S. Cl. ....................... 600/130; 600/153; 600/109; 600/104
(58) Field of Search .............................. 600/109, 110, 600/153, 160, 176, 104, 130

(56) References Cited

U.S. PATENT DOCUMENTS

| | | | | | |
|---|---|---|---|---|---|
| 4,741,327 A | * | 5/1988 | Yabe | ........................ | 600/109 |
| 4,773,396 A | * | 9/1988 | Okazaki | ........................ | 600/109 |
| 4,819,065 A | * | 4/1989 | Eino | ........................ | 600/109 |
| 4,860,732 A | * | 8/1989 | Hasegawa | ........................ | 600/109 |
| 4,868,644 A | * | 9/1989 | Yabe et al. | ........................ | 600/109 |
| 4,890,159 A | * | 12/1989 | Ogiu | ........................ | 600/109 |
| 4,891,695 A | * | 1/1990 | Uchikubo | ........................ | 358/98 |
| 4,971,035 A | * | 11/1990 | Ito | ........................ | 600/109 |
| 5,291,010 A | * | 3/1994 | Tsuji | ........................ | 600/109 |
| 5,305,736 A | * | 4/1994 | Ito | ........................ | 600/109 |
| 5,323,765 A | * | 6/1994 | Brown | ........................ | 600/109 |
| 5,376,960 A | * | 12/1994 | Wurster | ........................ | 348/76 |
| 5,427,087 A | * | 6/1995 | Ito | ........................ | 600/109 |
| 5,445,157 A | * | 8/1995 | Adachi | ........................ | 600/109 |
| 5,827,172 A | * | 10/1998 | Takahashi | ........................ | 600/174 |

FOREIGN PATENT DOCUMENTS

| | | | | |
|---|---|---|---|---|
| JP | 60-233611 | * | 11/1985 | |
| JP | 63-119747 | * | 5/1988 | ............ A61B/17/28 |

* cited by examiner

Primary Examiner—John P. Leubecker
(74) Attorney, Agent, or Firm—Ostrolenk, Faber, Gerb & Soffen, LLP

(57) ABSTRACT

An electronic endoscope includes a solid imaging device with a rectangular effective imaging plane built into the tip of an inserting portion; and an endoscope channel through which endoscope fixing pieces are inserted; wherein the opening of the endoscope channel is positioned to the long side of the effective imaging plane of the solid imaging device at the tip of the inserting portion.

10 Claims, 7 Drawing Sheets

ELECTRONIC ENDOSCOPE

BACKGROUND OF THE INVENTION

1. Field of the Invention

The present invention relates to an electronic endoscope which has an endoscope channel and is provided with a solid state imaging device serving as imaging means, on the tip thereof.

2. Description of the Related Art

Medical endoscopes which allow a slender insertion portion to be inserted into body cavities to observe internal organs or the like, or performing various types of therapy by means of therapeutic tools inserted through a therapeutic tool channel, have been widely used. Also, in industrial fields, industrial endoscopes for observing or inspecting for damage or corrosion in boilers, gas turbine engines, chemical plants, and the like are also in widespread use.

In the case of inspecting the interior of a gas turbine engine, for example, using the industrial endoscope, the method which has been used is a follows: an assisting hook portion inserted through an endoscope channel provided to the endoscope beforehand is latched onto a movable turbine blade, and the tip of the endoscope is introduced to the interior of the engine. Then, the aforementioned turbine blade is slowly rotated, and inspection is made of whether or not there is any chipped or cracked portions or such on the fixed turbine blades and so forth, one blade at a time.

For example, Japanese Unexamined Patent Publication No. 60-233611 discloses observation fixing device for an endoscope consisting of a hook member provided with a key-like formation on the tip of a flexible shaft which can be masses through the interior of a channel of the endoscope, and tension fixing means for providing tension to the rear end of the aforementioned hook member protruding from the operating unit of the endoscope, thereby fixing the hook member, whereby the endoscope can be retained at a desired position in a sure manner and the desired portion can be thus observed.

Also, Japanese Unexamined Patent Publication No. 60-119747 discloses a forceps-pressing device consisting of detachable connecting means provided to the forceps introduction opening at the forceps insertion channel formed to the endoscope, and a sliding member and pressing means for pressing this sliding member, so as to fix the axial portion of the forceps projecting from the aforementioned introduction opening in a pressed state with force such as tension and the like, wherein the movable portion of the slide member and the pressing means are formed in a state parallel in the longitudinal direction. However, the imaging means for the endoscopes used with the aforementioned observation fixing device and forceps pressing means consists of a so-called fiber scope, using fiber optics.

In recent years, electronic endoscopes with solid state imaging devices provided on the tip thereof as imaging means have come into use, and these perform inspection within gas turbine engines by latching an assisting hook member into a turbine blade, in the same manner as with the aforementioned fiber scope.

Figure 1:
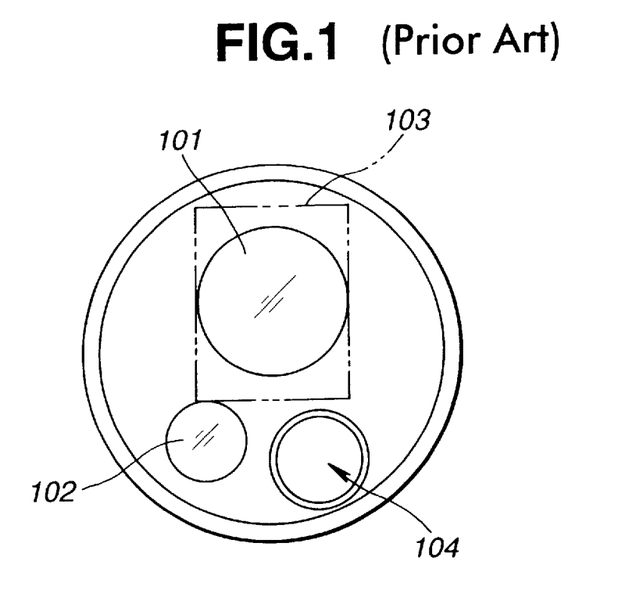
FIG. 1 is a diagram illustrating the positional relation between the effective imaging plane of the CCD positioned to the tip of the inserting portion of the electronic endoscope, the illumination window, and the endoscope channel opening.

However, as shown in FIG. 1, with industrial endoscopes having a solid imaging device such as a CCD provided on the tip to serve as an imaging device, the position of the light guide fiber and illumination window 102 serving as the illumination optical system for supplying illumination light to the observation window 101 and the CCD comprising the observation optical system for imaging the object, have been determined with higher priority. Accordingly, the position of the endoscope channel has been set as appropriate in the space left over after positioning the aforementioned observation window 101 and illumination window 102.

Accordingly, in the event that the form of the effective imaging plane 103 of the aforementioned CCD is rectangular, as shown by the double-broken line, there were cases in which the opening 104 of the endoscope channel was positioned at the short side of the CCD effective imaging plane 103.

In the event that a hook member is latched onto a turbine blade with an endoscope in which the opening 104 of the endoscope channel is positioned at the short side of the CCD effective imaging plane 103, and inspection is carried out in such a state, problems such as described below may occur.

Figure 2:
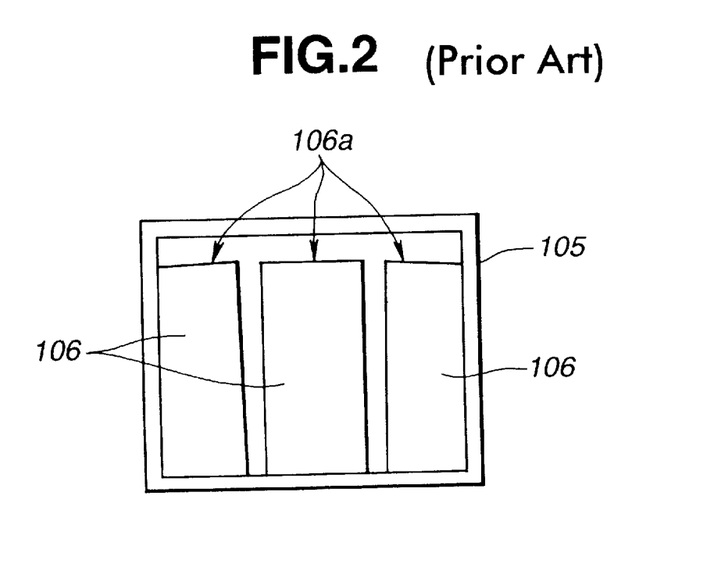
FIG. 2 is a diagram illustrating and example of display of an object on the monitor screen.

The longitudinal dimensions and the width dimensions of the slender turbine blade which is the point of observation protruding from the engine shaft do not agree with the vertical and horizontal ratio of the aforementioned CCD effective imaging plane 103, and accordingly, the longitudinal direction of the slender turbine blade 106 is displayed in the direction following the short side of the monitor 105, as shown in FIG. 2. Accordingly, in the event that the tip 106a of the turbine blade 106 which is prone to chipping and cracking is displayed on the screen, part of the turbine blade 106 toward the engine shaft goes off the screen.

SUMMARY OF THE INVENTION

Accordingly, it is an object of the present invention to provide an electronic endoscope whereby a turbine blade can be displayed on the monitor screen in the longitudinal direction in its entirety from the base portion to the tip portion for endoscope inspection.

Stated simply, the electronic endoscope according to the present invention comprises: a solid state imaging device with a rectangular effective imaging plane built into the tip of the inserting portion; and an endoscope channel through which endoscope fixing pieces are inserted; wherein the opening of the endoscope channel is positioned to the long side of the effective imaging plane of the solid state imaging device at the aforementioned tip of the inserting portion.

BRIEF DESCRIPTION OF THE DRAWINGS

FIG. 1 and FIG. 2 are diagrams describing a known embodiment;

FIG. 3 through FIG. 12 are diagrams illustrating a first embodiment;

FIG. 13 and FIG. 14 are diagrams describing a second embodiment of the present invention;

DESCRIPTION OF THE PREFERRED EMBODIMENTS

Figure 3:
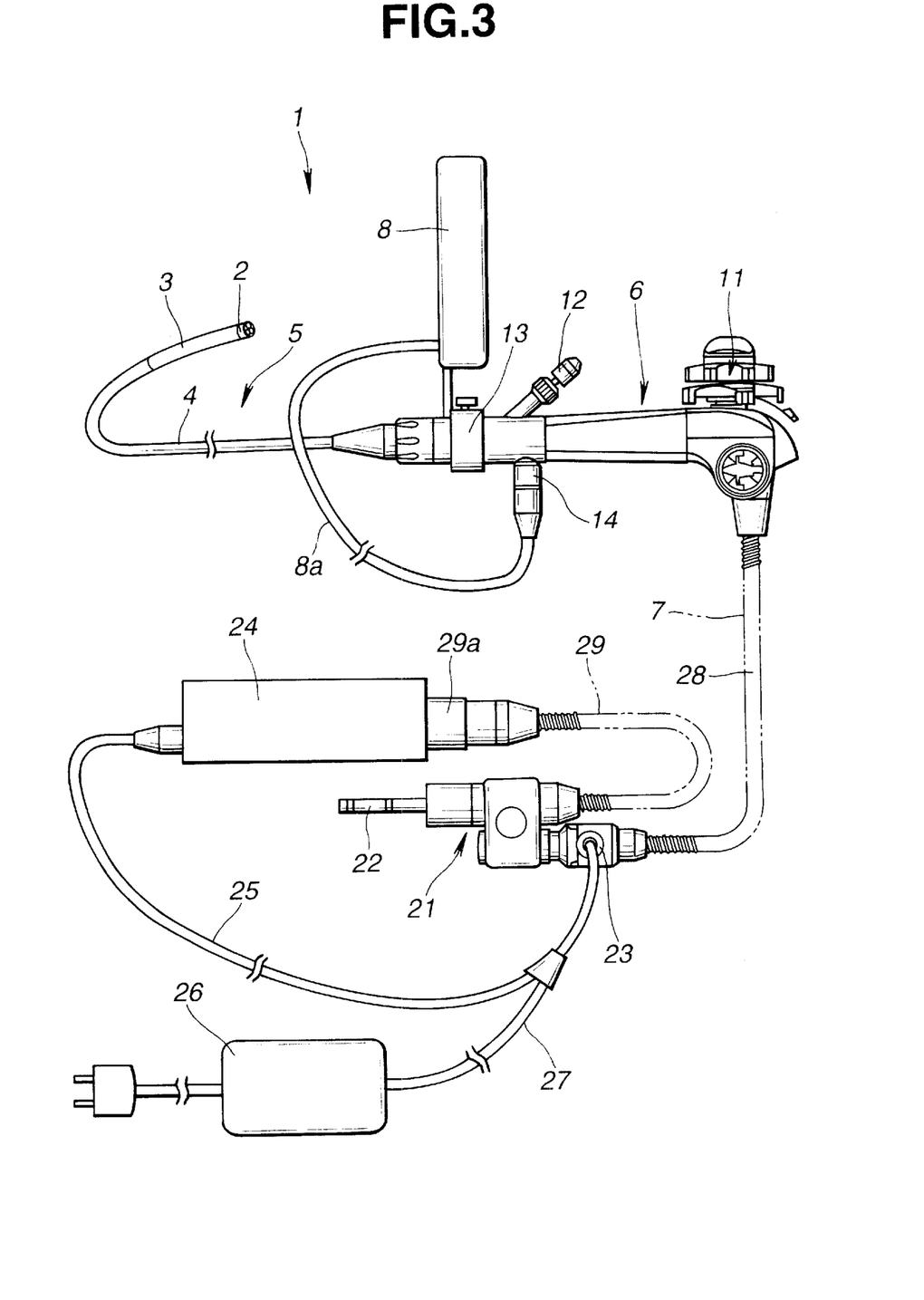
FIG. 3 is an explanatory diagram illustrating the construction of an electronic endoscope.

As shown in FIG. 3, the electronic endoscope 1 according to the present invention (hereafter referred to simply as "endoscope") is for inspecting the interior of engines such as gas turbines, comprised of the following in order from the tip side: a tip portion 2 formed of solid material, a bent portion 3 comprised of a plurality of bent pieces rotatably connected so as to be freely bent both vertically and horizontally, slender flexible tubing 4, an insertion portion 5 comprised of a continuation of the flexible tubing 4, an operating unit 6 connected to the base of this insertion portion 5, and a flexible universal cord 7 extending from the side of this operating unit 6.

The aforementioned operating unit 6 is provided with a bending operating knob 11 for operating the bending of the bent portion 3 provided to the insertion portion 5, a channel insertion opening 12 for inserting endoscope fixing pieces and the like provided with a hook member or the like through the later-described endoscope channel, an LCD attaching attachment 13 for positioning a liquid crystal display (hereafter referred to as "LCD") for displaying the observation image, an LCD connector for outputting video signals and power source to be supplied to the aforementioned LCD monitor.

A universal connector 21 is provided to the end of the aforementioned universal cord 7. The LG connector 22 protruding from this universal connector 21 is detachably connected to an unshown light source device. Also, a CCU connector 29a connected to a CCU 24 is provided from the aforementioned universal connector 21 via the CCU cable. Further, a video connector is provided to the universal connector 21. Extending from this video connector 23 is a signal cord 25 connected to the camera control unit (hereafter referred to as "CCU") and a electric power source cord having an AC/DC electric power source device 26 supplying power source for driving the aforementioned CCU 24 and LCD monitor 27.

The LCD connector of the aforementioned operating unit 6 and the video connector 23 of the universal connector 21 are connected by a signal cable 28 inserted through the inside of the universal cord. The video signals and the power source output from the aforementioned AC/DC electric power source device 26 for driving the LCD monitor 8 are transmitted to the LCD connector 14 via this signal cable 28. Accordingly, the signal line extending from the CCU 24 to the LCD monitor 8 is not exposed from the endoscope and does not get in the way, and thus operability is improved.

Figure 4:
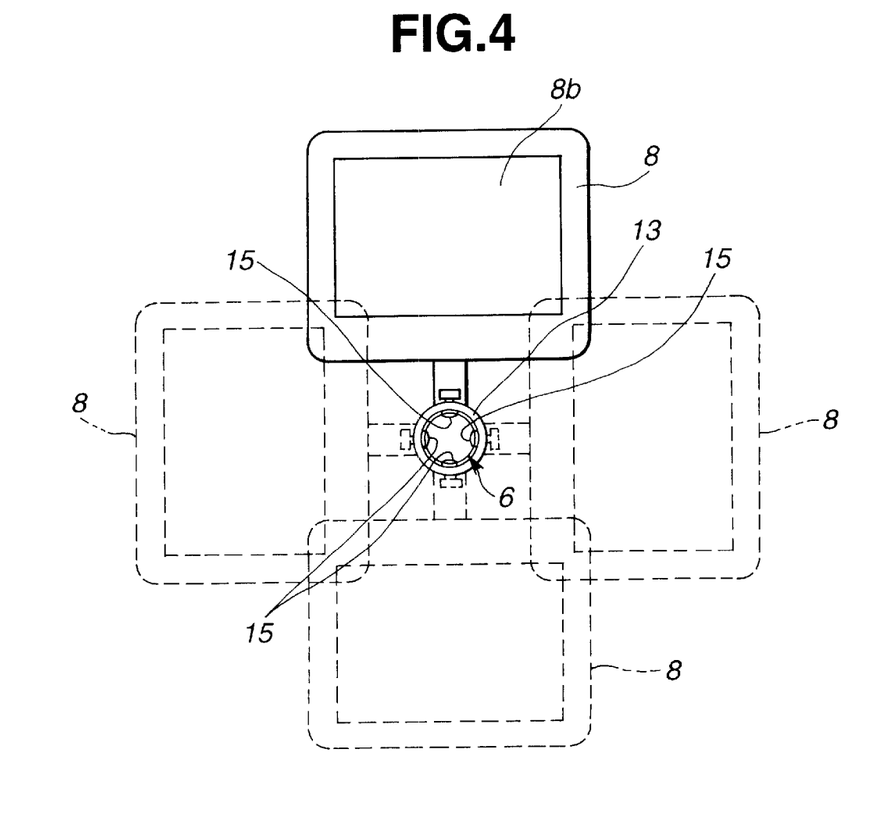
FIG. 4 is a diagram for describing the positional relation regarding the LCD operating unit.

Also, as shown in FIG. 4, the aforementioned operating unit 6 is provided with plurality of positioning recessions 15 (e.g., four) for positioning the LCD attachment 13, such that the operability and workability can be improved by the user positioning the aforementioned LCD monitor 8 to a desired position. Incidentally, the reference numeral 8b denotes the monitor screen of the LCD monitor 8.

Figure 5:
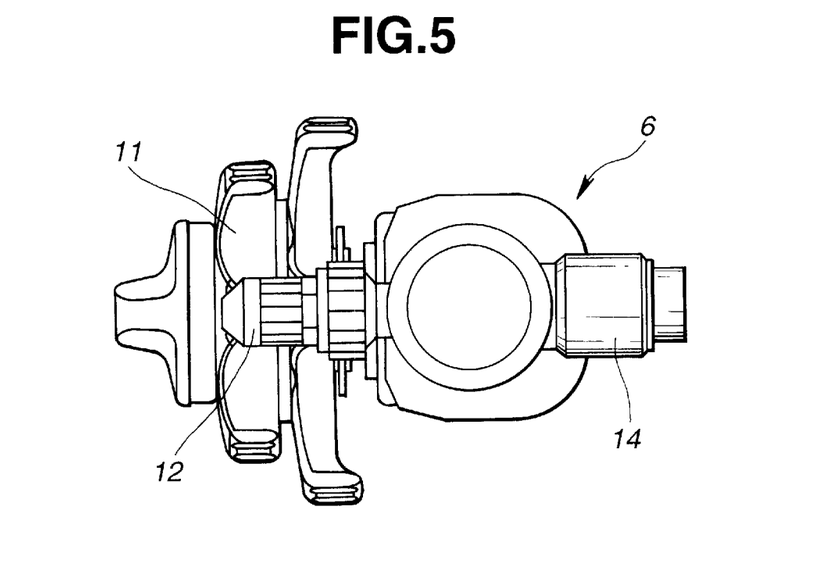
FIG. 5 is a diagram for describing the positional relation between a curved knob provided to the operating unit, the channel insertion opening, and an LCD connector.

Further, as shown in FIG. 5, while the aforementioned channel inserting opening 12 and the bending operating knob 11 are protruded in the same direction, the aforementioned LCD connector 14 is provided so as to protrude from the opposite side of the channel inserting opening 12. Thus, the camera cable 8a extending from the LCD monitor 8 and connected to the video connector is prevented from crossing with the jig protruding from the channel inserting opening 12, thereby improving operability. Also, at the time of storing the endoscope in an unshown endoscope storage case, the channel inserting opening 12 and the bending operating knob 11 protrude in the same direction, thereby improving storability.

Figure 6:
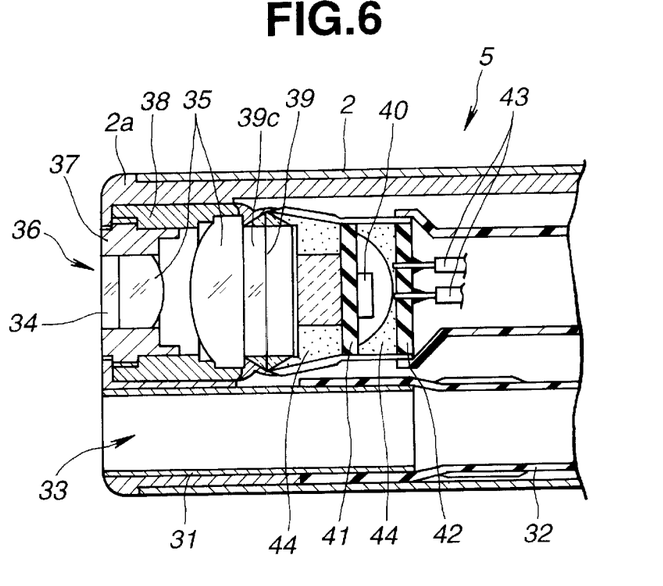
FIG. 6 is a cross-sectional diagram describing the configuration of the tip portion.

As shown in FIG. 6, provided to the tip portion 2 of the insertion portion 5 of the endoscope 1 are: an endoscope channel 33 comprised of a metal pipe 31 and a channel tube 32 connected to the base of this metal pipe 31; an observation optical system 36 comprised of a observation lens cover 34 and a plurality of optical lenses 35 and so forth; etc.

The aforementioned metal pipe 31 is integrally fixed to a tip portion main unit 2a comprising the tip portion 2. Also, the aforementioned observation lens cover 34 and plurality of optical lenses 35 and so forth are respectively fixed by adhesive agent to a first lens frame 37 and second frame 38. The first lens frame 37 and second frame 38 are integrally fixed to the tip portion main unit 2a, the same as with the metal pipe 31.

A CCD 39 serving as the solid state imaging device is fixed by adhesive agent to the imaging position of the aforementioned observation optical system 36. Electrically connected to the base side of this CCD 39 are a first substrate 41 mounted with electronic parts such as an IC 40, and a second substrate 42 to which are connected a plurality of signal lines 43. The CCD 39 and the substrates are formed integrally by means of a sealant resin.

Incidentally, the base of the aforementioned signal lines 43 are connected to the CCU 24 via the CCU connector 29a. Accordingly, the electric signal generated by photo-electric conversion at the aforementioned CCD 39 is transported to the CCU 24 where an image signal is generated, and this signal is transferred to the LCD monitor 8, whereby the endoscope image is displayed on the LCD monitor screen, and can be observed.

Figure 7:
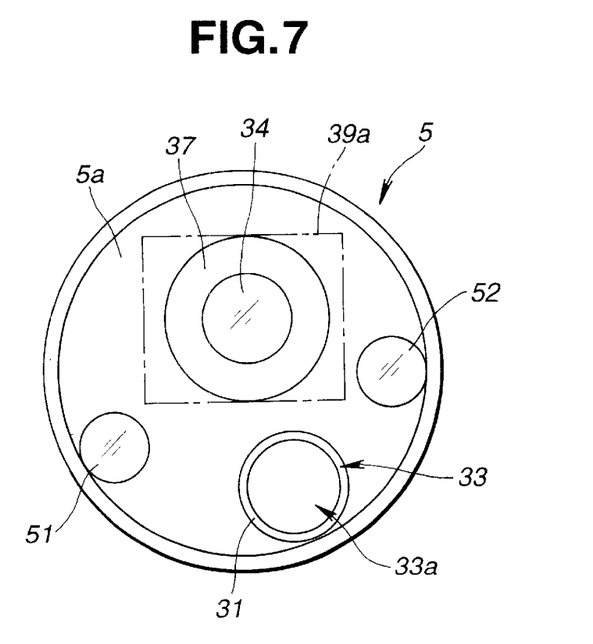
FIG. 7 is a diagram for describing the positional relation between the effecting imaging plane of the solid imaging device, the illumination window, and the endoscope channel opening.

As shown in FIG. 7, provided to the front plane 5a of the aforementioned insertion portion 5 is an observation lens cover 34 comprising the observation optical system 36, a pair of lenses 51 and 52 faced by the leading plane of a light guide (not shown) comprising the illumination option system, a channel opening 33a of the endoscope channel 33 through which jigs such as to endoscope fixing pieces-and so forth are passed.

The form of the effective imaging plane of the aforementioned CCD 39 is a rectangle which generally agrees with the vertical/horizontal ratio of the monitor screen 8b of the LCD monitor 8. The channel opening 33a of the endoscope channel 33 is positioned at the long side of the effective imaging plane 39a of the CCD, as shown in the Figure.

The pair of illumination lenses 51 and 52 is positioned so as have one on either side of the channel opening 33a of the endoscope channel 33. Thus, the shadow from the jig protruding from the aforementioned channel opening 33a can be erased by means of the illumination light cast from the two illumination lenses 51 and 52 positioned on either side of the channel opening 33a.

Figure 8:
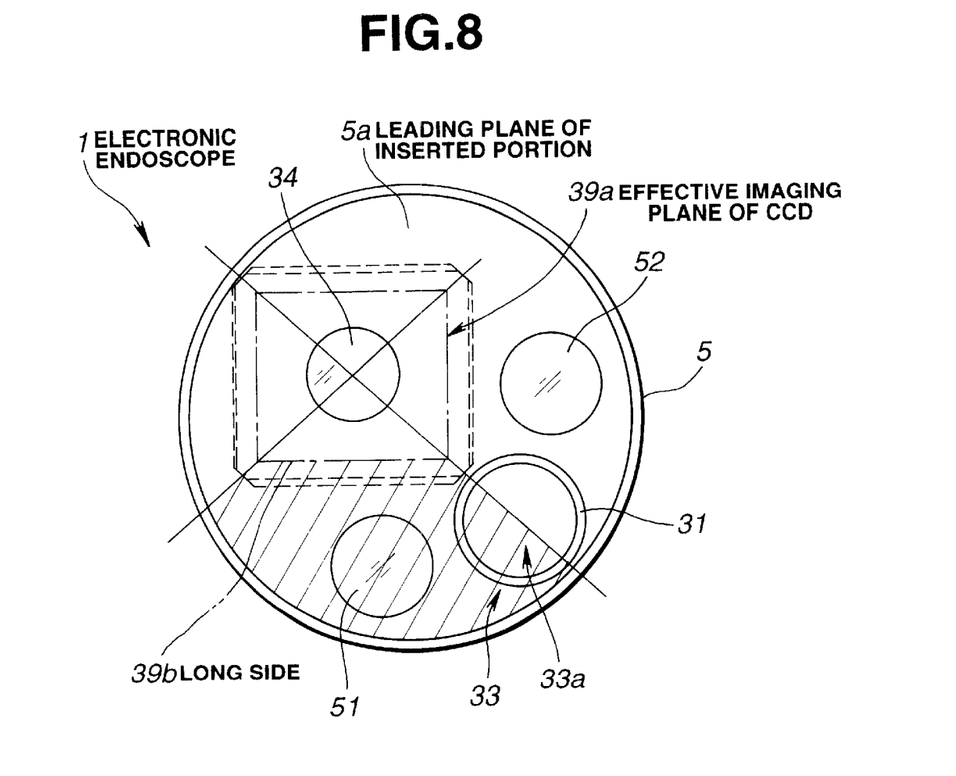
FIG. 8 is a diagram for describing the positional area of the endoscope channel opening provided to the tip of the inserting portion.

The specific positional relation of the aforementioned channel opening 33a with the front plane 5a will now be shown.

As shown in FIG. 8, more than half of the cross-sectional area of the channel opening 33a is within an area shown by slanted lines, enclosed by one effective image plane long side 30b of the CCD effective image plane 39a, extended lines of the two diagonal lines of the aforementioned effective image plane long side 30b, and the perimeter of the tip portion 2a. Also, the pair of illumination lenses 51 and 52 can be positioned so as have one on either side of the channel opening 33a, this being the portion at which the channel opening 33a is formed without loss.

The operation of the electronic endoscope thus formed will be described.

Figure 9:
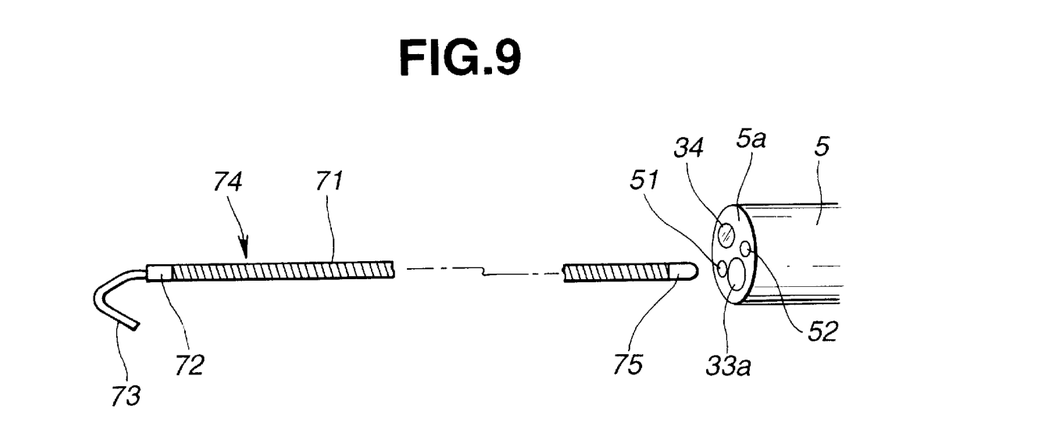
FIG. 9 is a diagram for describing the state of positioning the endoscope fixing piece to the endoscope channel.
Figure 10:
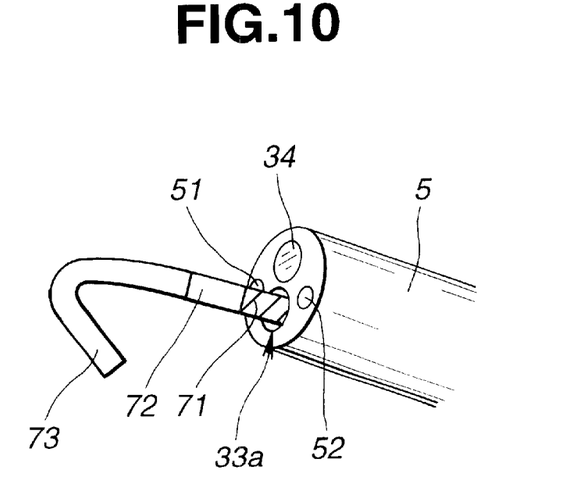
FIG. 10 is a diagram for describing the state of the endoscope fixing piece having been positioned to the endoscope channel.

First, as shown in FIG. 9 and FIG. 10, before carrying out the endoscope examination, a hook assembly 74 comprised of a hook member 73 attached to the tip cap 72 of a slender and flexible coil shaft 71 is inserted to and passed through the endoscope channel 33 from the channel opening 33a, by means of the front-loading method. Then, the rear cap 75 provided to the rear side of the hook assembly 74 is fixed to a certain position in the endoscope operating unit 6, so as to enable operations such as pushing and pulling rotating, fixing, and so forth.

Incidentally, the rear portion of the aforementioned rear cap 75 has been rounded in order to improve ease of passing through the endoscope channel 33 and in order to prevent the rear cap 75 from damaging the channel tube 32. Also, the aforementioned hook member 73 is detachable from the tip cap 72.

Figure 11:
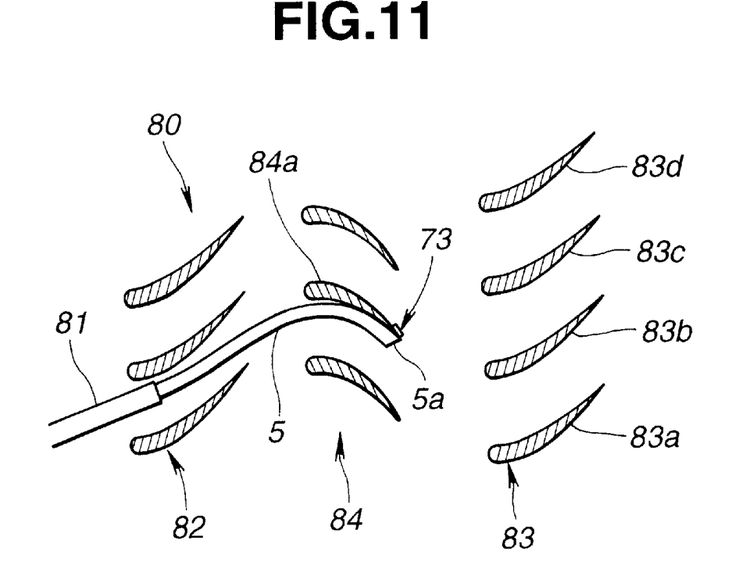
FIG. 11 is a diagram for describing the state of the interior of a gas turbine engine being inspected with an electronic endoscope.

Next, as shown in FIG. 11, the endoscope 1 is inserted to the interior of an engine using a guide tube 81 for inspecting the interior of gas turbine engines. In this state, the endoscope 1 and hook assembly 74 are operated so as to latch the hook member 73 onto one of the turbine blades 84a of the rotating turbine 84 positioned so as to rotate between the fixed turbines 82 and 83 within the engine. Then, the tip of the endoscope is guided to the aforementioned turbine blade 84a and the endoscope tip is fixed and positioned. Thus, the channel opening 33a side of the insertion tip is positioned so as to follow the turbine blade 84a.

Figure 12:
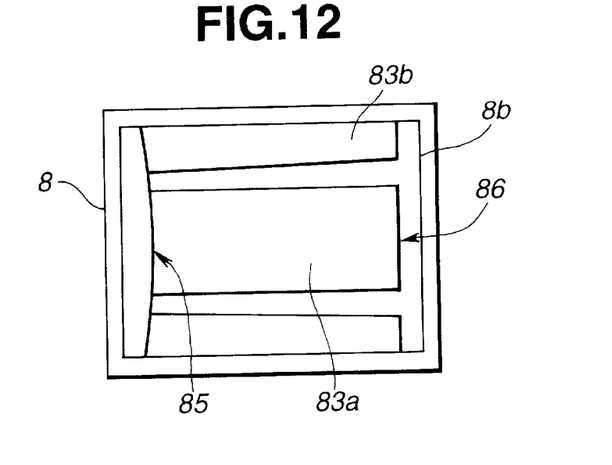
FIG. 12 is a diagram for describing the state of an object captured with the electronic endoscope being displayed on the monitor screen.

Next, the rotating turbine 84 is slowly rotated. This causes the turbine blades 83a, 83b, and so forth through 83n, of the fixed turbine positioned to the front of the aforementioned insertion tip plane 5a to be sequentially displayed on the monitor screen 8b of the LCD monitor 8, as shown in FIG. 12. At this time, the longitudinal direction of the CCD 39 and the longitudinal direction of the turbine blades 83a, 83b, and so forth through 83n of the fixed turbine agree, so the entire longitudinal length of each of the turbine blades 83a, 83b, and so forth through 83n is displayed at one time on the monitor screen 8b, from the base 85 to the tip 86 thereof.

Thus, the channel opening from which the hook member for fixing the endoscope tip to a desired position is extended is provided to the long side of the effective imaging plane of the CCD within the endoscope tip plane, so the longitudinal direction of the turbine blade which is to be observed is positioned in the longitudinal direction of the effective imaging plane of the CCD, whereby the entire longitudinal length of each of the turbine blades is displayed at one time on the monitor screen for inspection, thereby markedly improving the efficiency of the endoscope inspection.

Now, a second embodiment of the present invention will be described with reference to FIG. 13 and FIG. 14.

Figure 13:
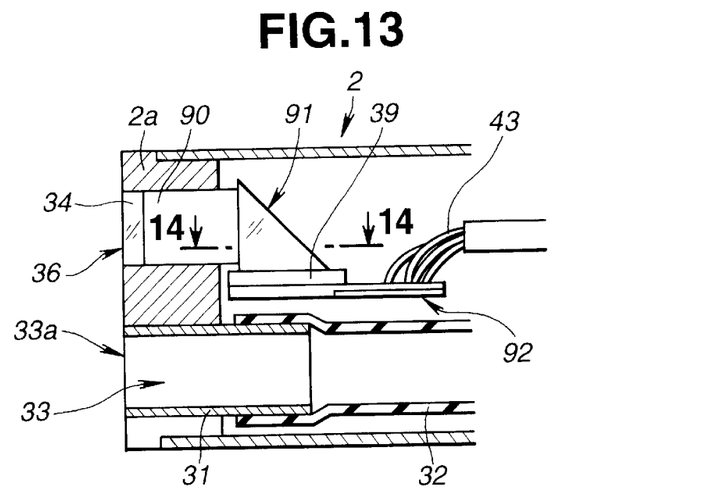
FIG. 13 is a cross-sectional diagram describing another configuration of the tip portion.

As shown in FIG. 13, according to the present embodiment, a prism 91 is positioned behind an object optical system 90 comprised of a plurality of lens groups (not shown) in the tip portion 2, the optical axis parallel to the longitudinal axis of the endoscope having passed though the aforementioned object optical system 90 is bent in a generally 90° angle at this prism 91, and the CCD 39 is positioned so as to orthogonaly intersect the optical axis bent at a 90° angle. That is to say, the CCD 39 is positioned parallel to the longitudinal axis of the endoscope.

Figure 14:
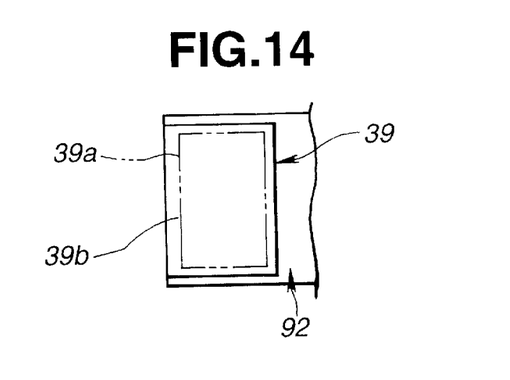
FIG. 14. is a diagram illustrating the CCD and substrate viewed from the direction of line 14—14 in FIG. 13.

As shown in FIG. 14, the positional relation of the CCD 39 at this time is such that the long side 39b of the effective imaging plane 39a of the CCD intersects the longitudinal axis of the endoscope at right angles. A substrate 92 is connected to the CCD 39. This substrate 92 is positioned parallel to the aforementioned CCD 39, with unshown electronic parts such as an IC being mounted thereupon and signal lines 43 being directly connected thereto.

Provided to the rear side direction of the aforementioned substrate 92 are channel tube 32 comprising the endoscope channel 33 and metal pipe 31. Accordingly, the channel opening 33a of the endoscope channel 33 is positioned to the long side of the effective imaging plane 39a of the CCD of the aforementioned insertion tip plane 5a, the same as with the above embodiment. Incidentally, other configurations of the present embodiment are the same as with the above embodiment, so the same members are provided with the same reference numerals and description thereof shall be omitted.

In this way, at the time of positioning the solid state imaging device parallel with the longitudinal direction axis of the endoscope, the long side of the effective imaging plane of the CCD is positioned so as to be at right angles with the longitudinal direction axis of the endoscope, and the endoscope channel is provided to the rear side of the substrate positioned parallel to this solid state imaging device, whereby the channel opening of this endoscope channel is positioned to the long side of the effective imaging plane of the CCD at the tip plane of the insertion portion, consequently obtaining the same operation and advantages as with the aforementioned first embodiment.

Also, at the time of positioning the solid state imaging device parallel with the longitudinal direction axis of the endoscope, the long side of the effective imaging plane of the CCD is positioned at a generally center position of the tip portion at a positional relation to orthogonaly intersect the longitudinal direction axis of the endoscope, thereby enabling reduction in the diameter of the tip of the endoscope.

It is clear that a wide range of various embodiments m of the present invention may be made without departing from the spirit and scope of the invention. The present invention is by no means restricted by any particular embodiments thereof, except as stated in the appended claims.

What is claimed is:

1. An electronic endoscope apparatus for observing the interior of a gas turbine engine, comprising:

an electronic endoscope having a solid state imaging device with a rectangular effective imaging plane having two sides substantially longer than another two sides, said solid state imaging device being built into the tip of an insertion portion of the endoscope, wherein said tip forms an end plane of said insertion portion and a projection of said rectangular effective imaging plane from said solid state imaging device intersects a portion of said end plane which corresponds in shape to said rectangular effective imaging plane;

an endoscope channel extending through the endoscope and having an opening at the end plane of the insertion portion, said opening substantially positioned along one of the longer sides of the portion of the end plane corresponding in shape to said rectangular effective imaging plane;

a fixing piece inserted in said endoscope channel so as to be rotatable therein and retractable therefrom for fixing said electronic endoscope to a base of a turbine blade, said fixing piece having a substantially U-shaped bent part bent at the tip for fixing said fixing piece by latching the bent part onto the base of the turbine blade, wherein when said bent part of said fixing piece is fixed to a turbine blade, said endoscope can be guided so that a length of the turbine blade is arranged in the longitudinal direction of the imaging plane with respect to the longer sides thereof for imaging of the turbine blade by said solid state imaging device; and a monitor on which an endoscope image captured with said solid state imaging device is displayed and dimensioned according to a vertical/horizontal measurement ratio which corresponds with the shorter side length/longer side length ratio of said rectangular effective imaging plane of said solid state imaging device the rectangular effective imaging plane being oriented in a direction corresponding with the dimensions of the monitor so as to display the image accordingly thereon.

2. An electronic endoscope according to claim 1,
wherein said solid state imaging device is provided behind an observation optical system and is disposed perpendicularly to the longitudinal direction axis of the endoscope.

3. An electronic endoscope according to claim 1, further comprising an observation optical system and a prism for bending an optical beam passing through said observation optical system at a right angle;
   wherein said solid state imaging device is provided behind said observation optical system and is generally perpendicular to the optical beam bent generally at a right angle by said prism positioned behind said observation optical system; and
   wherein one of the longer sides of the rectangular effective imaging plane of the solid state imaging device orthogonally intersects the longitudinal direction axis of the endoscope.

4. An electronic endoscope according to claim 1, wherein more than half of the cross-sectional area of the channel opening in the end plane of said insertion portion is within an area enclosed by one of the longer sides of the portion of the end plane corresponding in shape to said rectangular effective imaging plane, extended lines of two diagonals of said rectangular effective imaging plane, and the perimeter of the tip of the insertion portion.

5. An electronic endoscope according to claim 4, wherein the channel opening provided in the end plane of said insertion portion is positioned so as to be between a pair of illumination lenses.

6. A method for observing the interior of a gas turbine engine, comprising the steps of:

providing an electronic endoscope which includes a solid state imaging device with a rectangular effective imaging plane having two sides substantially longer than another two sides, said solid state imaging device being built into the tip of an insertion portion of the endoscope, wherein said tip forms an end plane of said insertion portion and a projection of said rectangular effective imaging plane from said solid state imaging device intersects a portion of said end plane which corresponds in shape to said rectangular effective imaging plane, and wherein said endoscope further includes an endoscope channel extending through the endoscope and having an opening at the end plane of the insertion portion, said opening substantially positioned along one of the longer sides of the portion of the end plane corresponding in shape to said rectangular effective imaging plane;

inserting a fixing piece in said endoscope channel so that the fixing piece is rotatable in the channel and retractable therefrom for fixing said electronic endoscope to a base of a turbine blade, said fixing piece having a substantially U-shaped bent part bent at the tip for fixing said fixing piece;

fixing said bent part of said fixing piece to a turbine blade by latching the bent part on the base of the turbine blade;

guiding said endoscope so that a length of the turbine blade is arranged in the longitudinal direction of the imaging plane with respect to the longer sides thereof for imaging the turbine blade by said solid state imaging device; and capturing an endoscope image produced with said solid state imaging device and displaying the captured image on a monitor, the monitor dimensioned according to a vertical/horizontal measurement ratio which corresponds with the shorter side length/longer side length ratio of said rectangular effective imaging plane of said solid state imaging device, wherein the rectangular effective imaging plane is oriented in a direction corresponding to the dimensions of the monitor so as to display the image accordingly.

7. An electronic endoscope apparatus adapted to observe within a gas turbine engine, comprising:
   an electronic endoscope having a solid state imaging device with a rectangular effective imaging plane built into the tip of an insertion portion of the electronic endoscope;
   an observation optical system and a prism for bending an optical beam passing through said observation optical system at a right angle,
      wherein said solid state imaging device is provided behind said observation optical system and is generally perpendicular to the optical beam bent generally at a right angle by said prism positioned behind said observation optical system, and
      wherein one of the longer sides of the rectangular effective imaging plane of the solid state imaging device orthogonally intersects the longitudinal direction axis of the endoscope;
   a fixing piece having a substantially U-shaped bent part bent at the tip thereof, said fixing piece being projected from the end plane of the tip of said electronic endoscope such that said bent part can be latched onto a turbine blade to thereby arrange the tip of said electronic endoscope; and a monitor for displaying an endoscope image captured with said solid state imaging device, the orientation and vertical/horizontal ratio of the rectangular effective imaging plane of said solid state imaging device corresponding with the orientation and vertical/horizontal ratio of a display screen of the monitor, wherein said electronic endoscope is adapted to oppose said turbine blade to be observed upon being guided to said turbine blade while said bent part of said fixing piece is latched onto said turbine blade, whereupon a positional relationship is established such that the orientation of the long dimension of the rectangular effective imaging plane of said solid state imaging device substantially coincides with the longitudinal orientation of the turbine blade from a base part to a tip of the turbine blade to be observed.

8. An electronic endoscope according to claim 7, wherein the rectangular effective imaging plane includes an actually used imaging area which is rectangular in which two sides are longer than the other two sides.

9. An electronic endoscope apparatus adapted to observe within a gas turbine engine comprising:

an electronic endoscope having a solid state imaging device with a rectangular effective imaging plane built into the tip of an insertion portion;

an observation optical system and a prism for bending an optical beam passing through said observation optical system at a right angle, wherein said solid state imaging device is provided behind said observation optical system and is generally perpendicular to the optical beam bent generally at a right angle by said prism positioned behind said observation optical system; and wherein one of the longer sides of the rectangular effective imaging plane of the solid state imaging device orthogonally intersects the longitudinal direction axis of the endoscope;

a monitor having a rectangular display area for displaying an endoscope image of said solid state imaging device; and means for orienting said electronic endoscope to oppose a turbine blade so that the longitudinal orientation of the turbine blade to be observed from a base part to a tip thereof can be displayed along the long dimension of the display area of said monitor.

10. An electronic endoscope apparatus according to claim 9, comprising:

wherein said means for orienting said electronic endoscope to oppose said turbine blade is a fixing piece having a substantially U-shaped bent part bent at the tip, said fixing piece being projected from the end plane of the tip of said electronic endoscope such that said bent part can be latched onto the turbine blade to thereby arrange the tip of said electronic endoscope relative to the turbine blade, said electronic endoscope is adapted to oppose said turbine blade to be observed upon being guided to said turbine blade while said bent part of said fixing piece is latches onto said turbine blade, whereupon a positional relationship is established such that the orientation of the long dimension of the rectangular effective imaging plane of said solid state imaging device substantially coincides with the longitudinal orientation of the turbine blade from a base part to a tip of the turbine blade to be observed.

* * * * *